United States Patent [19]
Brendle

[11] 4,083,120
[45] Apr. 11, 1978

[54] ELECTRONIC DEVICE FOR USE AS A TEACHING AID

[76] Inventor: Timothy T. Brendle, Rte. 4, Box 360, Spotsylvania, Va. 22553

[21] Appl. No.: 726,103

[22] Filed: Sep. 24, 1976

[51] Int. Cl.² ............................ G09B 5/00; G09B 7/06
[52] U.S. Cl. ........................................ 35/9 B; 35/9 C; 35/31 C; 35/48 A
[58] Field of Search .................... 35/6, 9 R, 9 B, 9 C, 35/9 D, 9 E, 31 R, 31 A, 48 R, 48 A, 31 C

[56] References Cited

U.S. PATENT DOCUMENTS

| | | | |
|---|---|---|---|
| 3,100,352 | 8/1963 | Boissevain | 35/9 C |
| 3,491,464 | 1/1970 | Gray | 35/48 R |
| 3,526,971 | 9/1970 | Shipley | 35/9 R |
| 3,562,922 | 2/1971 | Friedman et al. | 35/9 B |
| 3,605,286 | 9/1971 | Plumly | 35/9 A |
| 3,672,071 | 6/1972 | Prola | 35/9 B |
| 3,707,783 | 1/1973 | Hajduk | 35/31 R |
| 3,751,825 | 8/1973 | Barrett | 35/6 |
| 3,869,810 | 3/1975 | Ronalds | 35/9 C |
| 3,902,257 | 9/1975 | Hesener | 35/48 R |

Primary Examiner—Richard C. Pinkham
Assistant Examiner—Arthur S. Rose
Attorney, Agent, or Firm—Stevens, Davis, Miller & Mosher

[57] ABSTRACT

A teaching device having a base on which a program card is mounted. The base contains an electrical circuit having a plurality of count indicator lights and a further illuminated indicator. A rotary switch is mounted on the base and has a numeral display disc mounted thereon for displaying one of a series of numbers through a read-out opening in the base which is illuminated by the further illuminated indicator. The rotary switch also controls illumination of the count indicator lights based on the electrical circuit of the program card mounted on the base.

11 Claims, 10 Drawing Figures

ELECTRONIC DEVICE FOR USE AS A TEACHING AID

BACKGROUND OF THE INVENTION

This invention relates in general to a teaching aid and more particularly to an electronic device capable of being used effectively to teach very young pupils basic counting and number skills. The device is capable of being operated in modes of varying complexity so that it is a desirable training aid for the pupil just beginning to learn counting skills as well as for the pupil who is more advanced in his mastery of these skills.

A great deal of prior art exists relating to machines which utilize interchangeable cards having various questions or problems to be solved by the user of the machine. Prior art also exists which provides for cards having holes registering with contacts so that a probe may penetrate a hole and engage a contact which through an electrical circuit will permit an indication of a correct or an incorrect answer. U.S. Pat. Nos. 2,104,718; 3,869,810; 3,314,166; 3,100,352; and 3,106,784 illustrate the related prior art.

As can be seen from the prior art referred to above, and particularly U.S. Pat. No. 3,869,810, there exist machines for teaching children simple mathematics and/or association of words with objects by using interchangeable cards having pictorial and/or textural matter thereon in multiple choice question fashion. The matching capability of the present invention is not its novel function. It is basically a device capable of teaching the most basic numeric concept — the correlation of numbers to counted items. In its simplest mode of operation, the device permits the pupil to produce a variety of counted items (illuminated lamps) and immediately see the associated numeral displayed, thereby permitting the pupil to learn the count-number relationship by experience and self education. Obviously, the pupil may accomplish this at his own rate of learning.

One of the problems with heretofore known machines is that very young children are capable of learning basic counting before they are capable of handling the task of constantly changing program cards. Young children can also learn by repeated associations before they are ready to do multiple choice matching.

This device enables the very young pupil to work alone for hours, learning by repeated correct association, without changing a single program card. The pupil simply turns a selector knob to any of nine detent positions which he may select at random, always viewing the proper count-numeral relationship.

Another object of the present invention is to provide a device which the pupil may use in a self-education manner to learn a vocabulary of words for numbers associated with the count-number relationships which have been mastered in the simpler mode of operation of the present invention. By replacing the interchangeable program card with another appropriate program card bearing number words with associated electrical contact points, the pupil may select a variety of count items (illuminated lamps). Then, by touching the attached probe to the electrical contact adjacent to the written number word corresponding to the displayed count items, the pupil may immediately determine if the correct word has been chosen. If the answer is correct, the numeral answer will also be displayed, reinforcing the child's earlier learning experience. If an incorrect number word is selected, no numeral will be illuminated and the pupil will have to continue to make selections until a numeral is illuminated. A correct answer therefore reinforces the three-way relationship — count, number, and word, by displaying the correct numeral for the corresponding count and word. Once again, it should be noted that after the program card is inserted for this mode of operation, the pupil may use the device for hours of self-study without changing program cards.

Another object of the present invention is to provide a device which the pupil may use in a self-education manner to learn the concept of simple addition and subtraction. This may be accomplished in either of the previous modes of operation of the device as described above. The selection of count items is accomplished by turning a selector knob from one detent position to any of nine other detent positions. Turning the selector knob to the right will add to the count items illuminated, while turning the selector to the left will subtract from the number of count items by extinguishing one illuminated lamp for each detent position. The pupil can quickly learn this "add" or "subtract" relationship by observation as the teaching device is used. In the matching mode of operation the pupil may turn the selector knob to increase or decrease the number of count items and then select the appropriate word for the sum or the difference, receiving immediate affirmation with the displayed numeral answer if his answer is correct.

The present invention can also be used as a simple matching machine. By means of another interchangeable program card, only one of the count lamps is illuminated for each of the detent positions. The overlay on the program card depicts on one portion of the card numbered problems or questions to be answered. By turning the selector knob, the pupil will cause a lamp to be illuminated directly above one of the numbered problem areas. The portion of the program card not used to depict questions bears a variety of answers with associated cntact points. The pupil may use the probe attached to the device to touch the contact point adjacent to the appropriate answer to the question beneath the illuminated count lamp. No numeral will be illuminated unless the answer is correct. A correct answer will produce an immediate affirmative indication by illuminating the numeral which is the problem number.

It is obvious that there is virtually no limit to the variety of materials which may be used on interchangeable program cards or on interchangeable program cards which themselves have interchangeable overlays. Therefore the present invention may be used for general matching applications as well as for its specialized purpose of developing basic number skills. This dual application eliminates the need for the user to purchase two types of equipment.

DESCRIPTION OF THE PREFERRED EMBODIMENT

The teaching apparatus of this invention includes a box which houses the control apparatus, and program cards which may be interchangeably mounted on the box.

Figure 1:
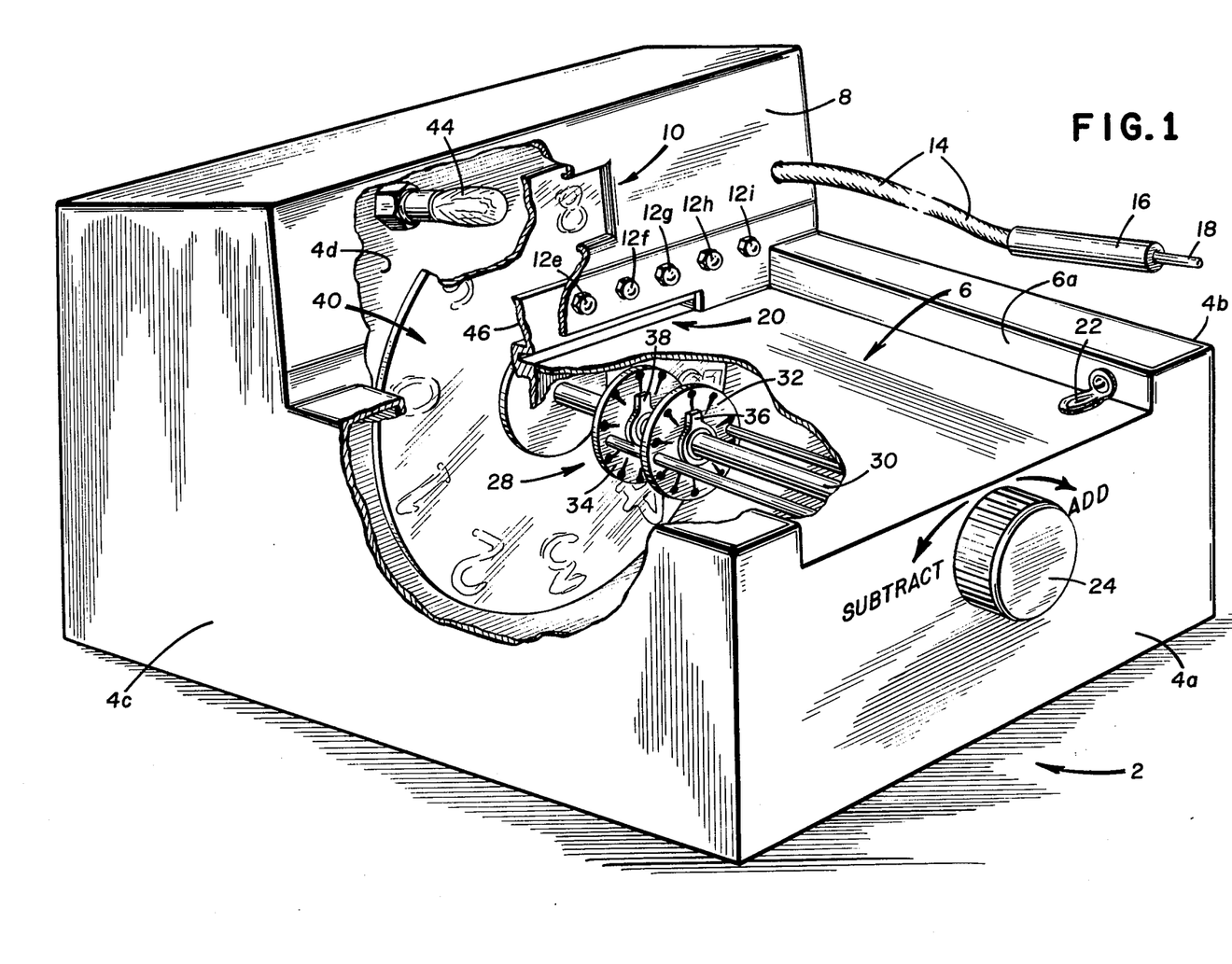
FIG. 1 is a perspective cut-away view of the teaching device.
Figure 2:
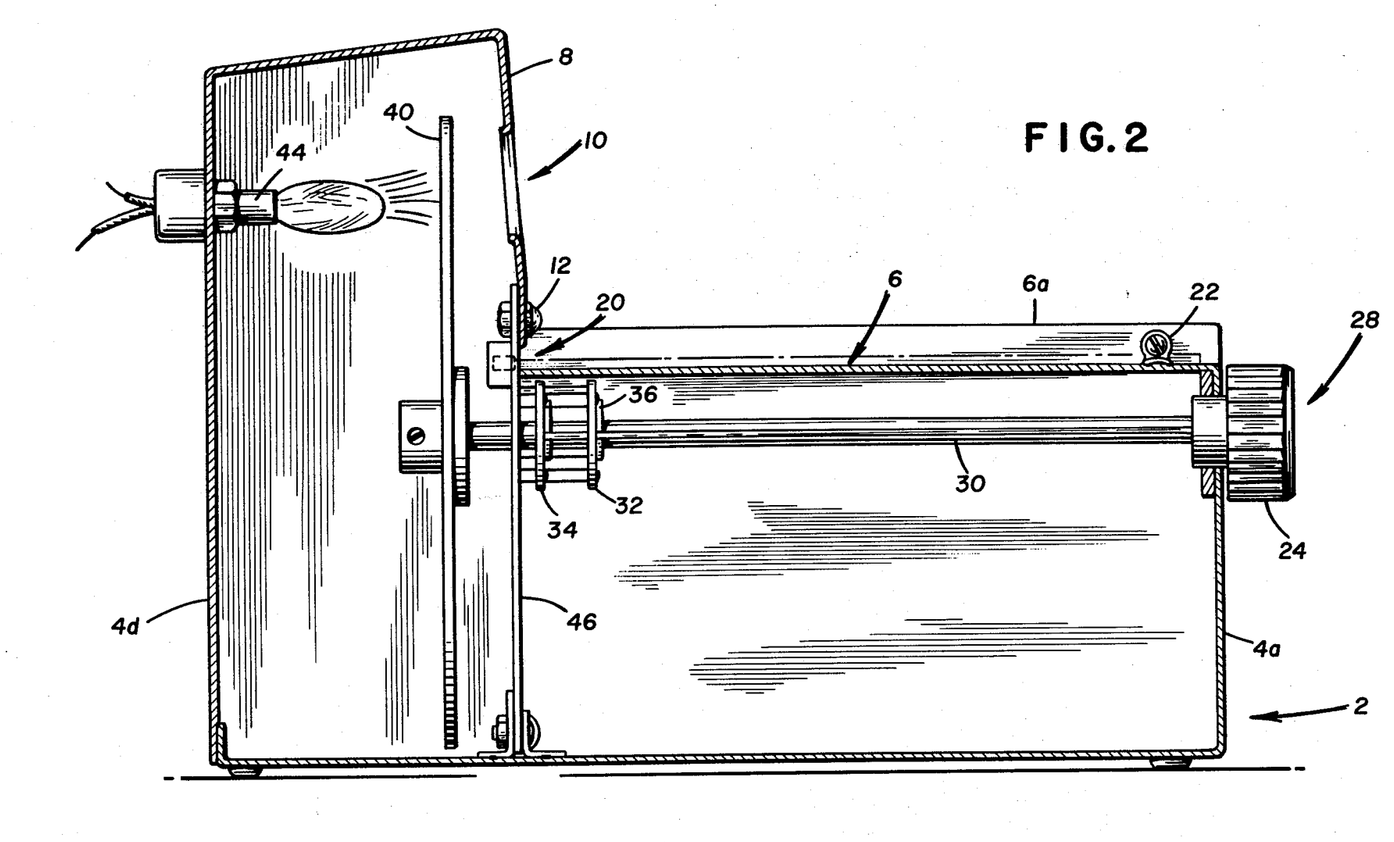
FIG. 2 is a side sectional view of the teaching device of FIG. 1.

FIGS. 1 and 2 show the construction of the teaching device box which includes a base 2 having a front upright wall 4a, upright side walls 4b, 4c which extend slightly higher than front wall 4a, and a rear wall 4d which extends higher than side walls 4b, 4c. Side walls 4b, 4c and rear wall 4d define the limits of a recessed program card deck 6. This recessed program card deck 6 may be located on a flat front face of the base 2. Behind the recessed program card deck 6, and constituting a part of back wall 4d is an upright indication panel 8 on which are located a numeral read-out opening 10 and count indicator lights 12a–12i, the functions of which will be described in more detail below.

A flexible electrical lead 14 for a probe assembly 16, having a probe electrode 18 at its end, extends, in this embodiment, from the upright indication panel 8. Obviously, the location of the electrical lead 14 is a matter of choice and it can be taken out of the base 2 from any suitable or desirable location.

Located on the front facing upright indication panel 8 and adjacent the line along which the panel intersects the program card deck 6 is a program card socket 20 for electrically connecting a program card to the program selector circuit located in the teaching device. Card socket 20 is a conventional multi-connector socket which accepts a similarly conventional multi-connector plug located on the program card. A pair of card retaining clips 22 (only one of which is shown) are located on the inner facing surfaces of side walls 4b, 4c which define the lateral extremes of the program card deck 6. Clips 22 may comprise L-brackets to retain a program card in place on the program card deck 6 and prevent it from being pulled upwardly by accident.

A selector knob 24 of a rotary switch assembly 28 extends from an upstanding front face 4a of base 2. The selector knob 24 is mounted on one end of a shaft 30 of the rotary selector switch assembly 28; shaft 30 extends through an opening in front face 4a. The switch assembly 28 also includes a pair of switch plates 32 and 34 which are coaxial with shaft 30. Rotary wipers 36 and 38 are mounted on the shaft 30 for rotation therewith. Wipers 36 and 38 respectively engage switch contacts 32a–32j and 34a–34j of switch plates 32 and 34 (see FIG. 3). Also mounted on shaft 30 for rotation therewith is a display disc 40 having numerals 0, 1, 2, . . . 9 on its face. The disc 40 may be made of an opaque material except for the portions defining the numeral outlines which are transparent. The disc is arranged inside the box 2 such that the numerals appear individually in numeral read-out opening 10. An indicator light source consisting of a lamp assembly 44 is mounted on the inside of rear wall 4d behind the numeral read-out opening 10 to illuminate numerals appearing in opening 10.

The rotary selector switch assembly 28 is of a conventional type having ten click-stop positions and a detent which prevents rotation between the $a$ and $j$ positions. Thus, the switch can neither be rotated directly from $a \rightarrow j$ nor from $j \rightarrow a$.

Figure 3:
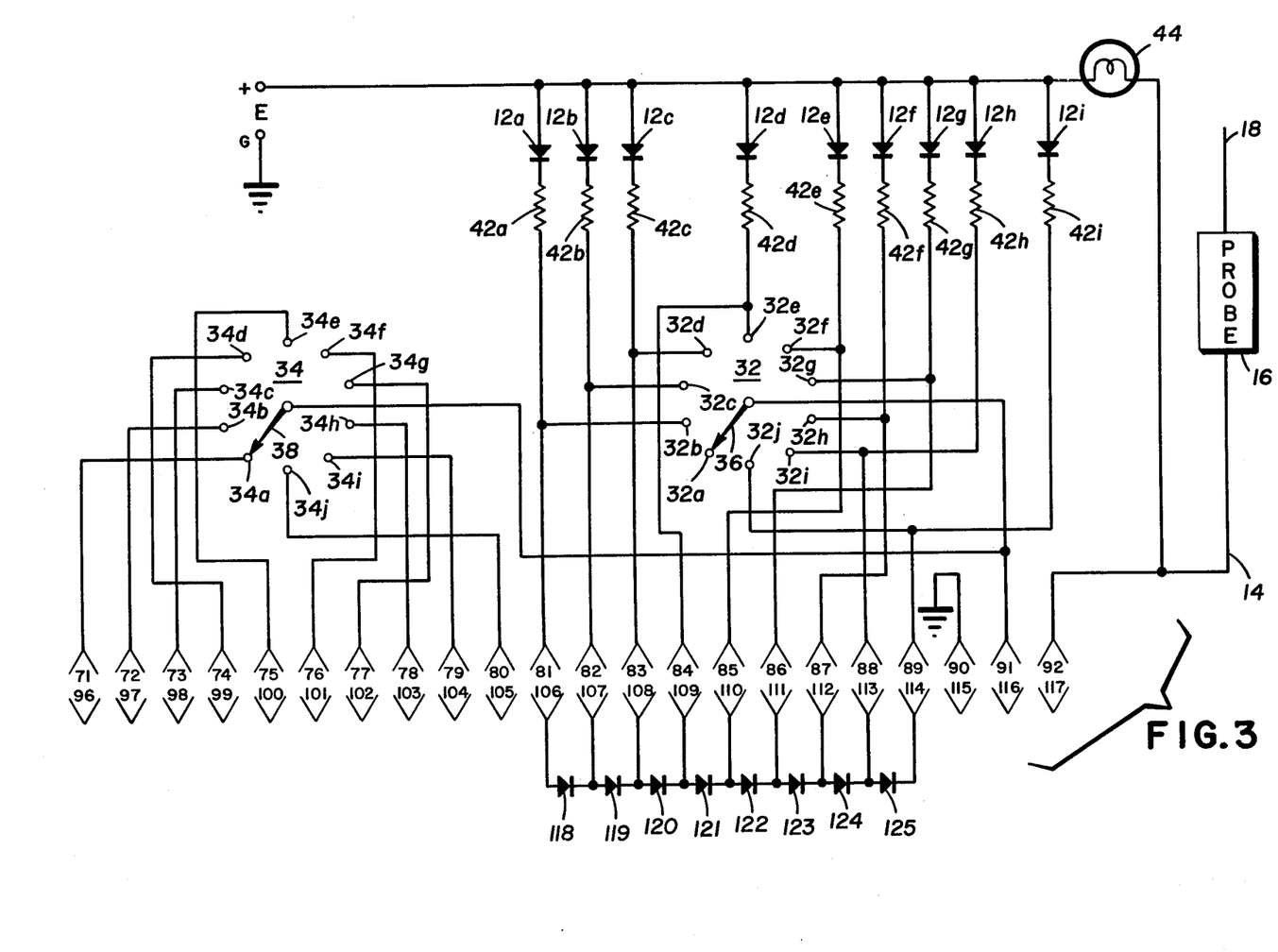
FIG. 3 is a schematic diagram of the electrical circuit of the teaching device.

The electrical control circuit for the teaching device is shown in FIG. 3. The card socket 20 is shown as having two groups of terminals: socket terminals 71–92 are located on the top side of the socket and terminals 96–117 are located on the bottom side of the socket. The electrical supply is derived from a D.C. source, E, having a positive supply terminal "+" and ground "G". Power supply E may be either in the form of a battery or a rectified A.C.; also, the polarities may be reversed from those shown without materially altering the essence of this invention. Count indicator lights 12a–12i comprise, for example, light emitting diodes having their anodes connected in common to E+ and the cathodes connected through respective resistors 42a–42i to switch contacts 32b–32j, respectively, of rotary switch plate 32 and to a first set of terminals 81–89, respectively, of the program card socket 20. Switch contacts 34a–34j of rotary switch member 34 are connected to a second set of terminals 71–80, respectively, of program card socket 20. Terminals 96–105 are electrically identical with terminals 71–80, respectively.

A set of diodes 118–125 are series connected between a third set of terminals 106 and 114; the anode of diode 118 is connected to terminal 106, the junction of diodes 118 and 119 is connected to terminal 107, the junction of diodes 119 and 120 is connected to terminal 108, the junction of diodes 120 and 121 is connected to terminal 109, the junction of diodes 121 and 122 is connected to terminal 110, the junction of diodes 122 and 123 is connected to terminal 111, the junction of diodes 123 and 124 is connected to terminal 112, the junction of diodes 124 and 125 is connected to terminal 113, and the cathode of diode 125 is connected to terminal 114. Terminals 115–117 are open.

Wiper arms 36 and 38 are connected in common to a fourth terminal 91 of program card socket 20; a fifth terminal 90 is connected to ground. Indicator lamp 44 is connected to E+ and to a sixth terminal 92 to which probe lead 14 is also connected.

The various circuit components of the circuits described above may be located on a circuit board 46 mounted inside the box 4 such that light emitting diodes 12a–12i appear through openings in the front face of indication panel 8 (see FIG. 2).

Figures 4, 4A:
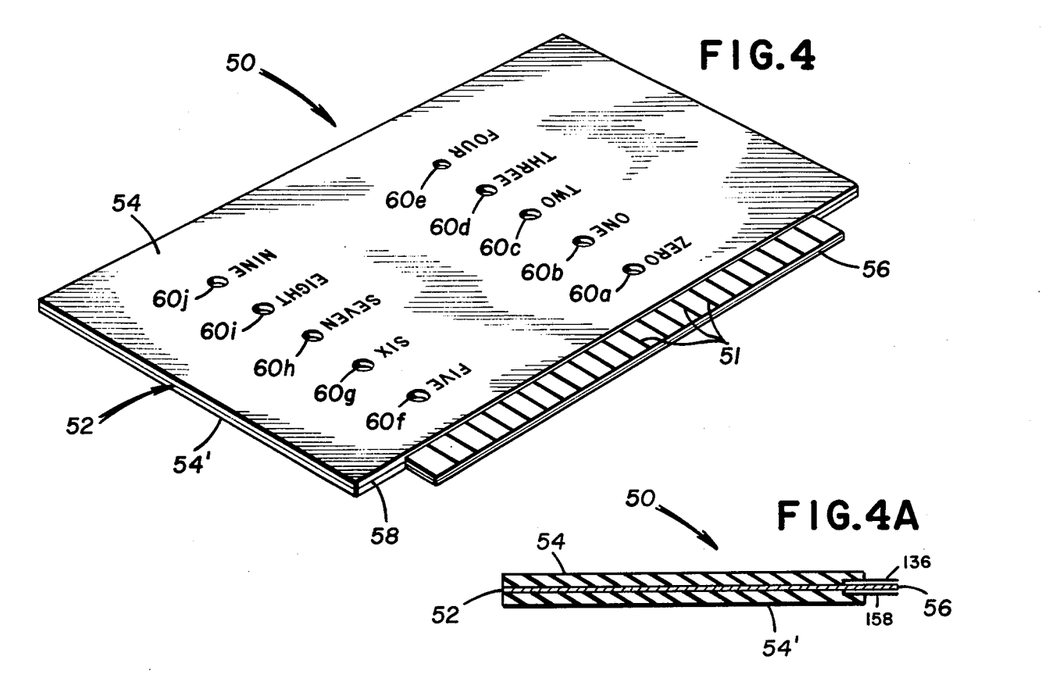
FIG. 4 is a perspective view of a representative program card.
FIG. 4A is a sectional view of the program card.

To complete any of the electrical circuits by which indicator lamp 44 and/or count indicator lights 12a–12i are illuminated, a program card must be inserted into the device; a representative program card is shown in FIGS. 4 and 4A. Each program card 50 comprises a printed circuit board 52 sandwiched between opaque cover layers 54, 54', made, for example, of a laminated vinyl. One or both opaque cover layers may have openings which overlie portions of the program card electrical circuit. The printed circuit board 52 has a portion 56 which extends from one edge 58 of the program card. This extension contains electrical leads, for example, in the form of plated copper bars 51 aligned with each other on the top and/or bottom faces of the printed circuit board 52. Together, these leads constitute a multiple plug that mates with card socket 20 when the card 50 is mounted on the recessed surface portion of the base 4. Desired ones of the upper and lower face leads (e.g., upper and lower card leads 136 and 158, respectively) may be commonly connected through holes in the circuit board (see FIG. 4A). The various techniques for making printed circuit cards (of both the single and two-sided varieties) are well known to skilled workers.

Figure 5:
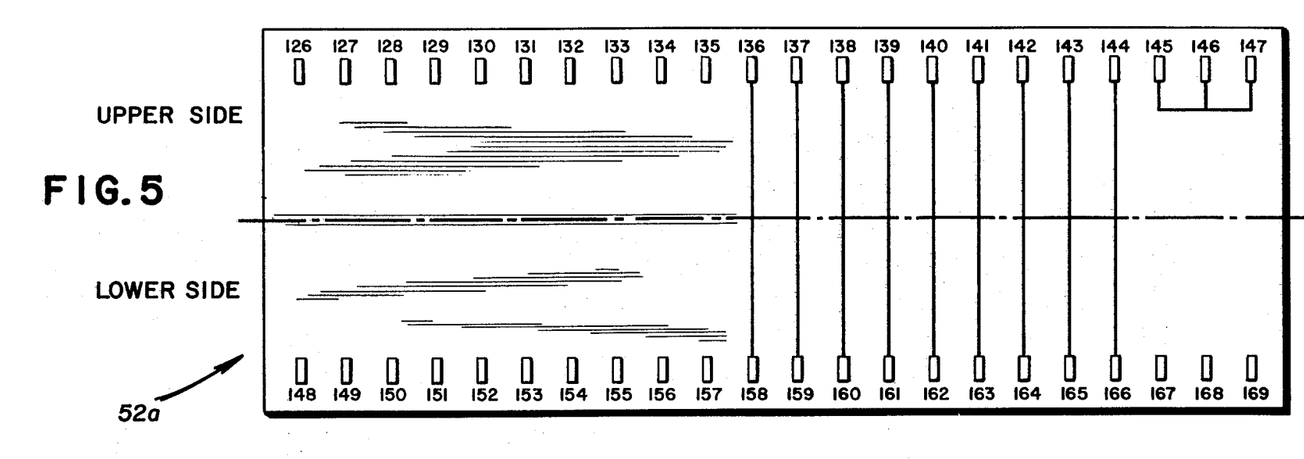
FIG. 5 is a schematic diagram of a simple mode program card electrical circuit.

An example of the electrical circuit of a simple mode program card is shown in FIG. 5. The printed circuit board 52a includes two groups of contacts; the upper group (that is, the group of contacts located on the upper side of the board) includes a first set of terminals 136–144 which mate with socket terminals 81–89, respectively, and a second set of terminals 126–135 which mate with socket terminals 71–80, respectively. The lower group (that is, the group of contacts located on the lower side of the printed circuit board) includes a third set of card terminals 158–166 electrically connected directly to card terminals 136–144, respectively; card terminals 158–166 mate with the third set of socket terminals 106–114, respectively. A fourth card terminal 145 and a fifth card terminal 146, both on the upper side of the board, are directly connected electrically and mate with socket terminals 90 and 91, respectively, to complete a circuit path between wipers 36, 38 and ground. A sixth card terminal 147 is also located on the upper side and is connected directly to terminals 145 nd 146. Terminal 147 mates with socket terminal 92 to complete a circuit path between E+ through indicator lamp 44 to ground. When the simple mode program card is inserted into the teaching device, socket terminals 71–80 remain open and switch 34 plays no part in the operation of the device.

The operation of the teaching device with the simple mode program card inserted will now be described. FIG. 3 shows the position of wiper 36 at the end of the counter-clockwise rotation of the switch assembly 28. In this position, wiper 36 makes contact with switch contact 32a which is not connected to any of the count indicators 12. In this position, the display disc 40 is positioned so that the numeral "0" appears in the numeral read-out opening 10. Insertion of the simple mode program card into the teaching device operates to switch on indicator lamp 44 as a result of completion of the current flow path through socket terminal 92, card terminals 147 and 145 and socket terminal 90. Thus, in the counter-clockwise-most position of the selector switch 28, no count indicators are lit and the numeral "0" is illuminated in the read-out opening 10.

Upon rotation of the selector switch one step in the clockwise direction, wiper 36 contacts switch contact 32b which is connected through resistor 42a to the cathode of light emitting diode 12a. A circuit is thus completed between E+, through diode 12a, resistor 42a, switch contact 32b, wiper 36, socket terminal 91, card terminals 146 and 145 and socket terminal 90 to ground. During this same one step rotation of the selector switch, disc 40 rotates to display the numeral "1" in read-out opening 10 to represent the fact that one indicator lamp 12 is lit. A further one step rotation of the selector switch causes wiper 36 to engage contact 32c. This completes a current path from E+, through diode 12b, resistor 42b, contact 32c, wiper 36, socket terminal 91, card terminals 146 and 145 and socket terminal 90 to ground. At the same time, a further circuit is completed from E+, through diode 12a, resistor 42a, socket terminal 81, card terminals 136 and 158, socket terminal 106, diode 118, socket terminal 107, card terminals 159 and 137, socket terminal 82 to switch contact 32c. In this position, therefore, two indicator lamps 12a and 12b are lit. At the same time, display disc 40 has rotated one step so that the numeral "2" appears illuminated in read-out opening 10.

The above sequence may be followed for each of the remaining seven clockwise rotational steps until, in the clockwise-most rotational position, wiper 36 contacts switch contact 32j so that all nine count indicator lamps 12a–12i are lit and the display disc 40 has been rotated to display the numeral "9" in the read-out opening 10.

Conversely, rotation in the counter-clockwise direction of the selector switch results in the extinction of one indicator lamp 12 for each return step. For example, a one step counter-clockwise rotation from position 32j to 32i breaks the circuit between light emitting diode 12i and ground through wiper 36; diode 125 becomes reverse biased to block the current flow path between light emitting diode 12i and any of switch contacts 32b–31i.

This operation manifests itself visually to the student using the teaching device in the following way. As the selector switch 28 is rotated in a clockwise direction, an additional indicating lamp 12 is lit for each rotational step. The total number of indicating lamps lit is displayed by the corresponding numberal on disc 50 being aligned with read-out opening 10 and illuminated by lamp 44. As the selector switch is rotated in the counter-clockwise or "subtract" direction, one indicator lamp 12 is extinguished for each rotational step and the corresponding number of lamps remaining lit is displayed through read-out opening 10. In this manner, the student learns the basic concepts of addition and subtraction.

Figure 6:
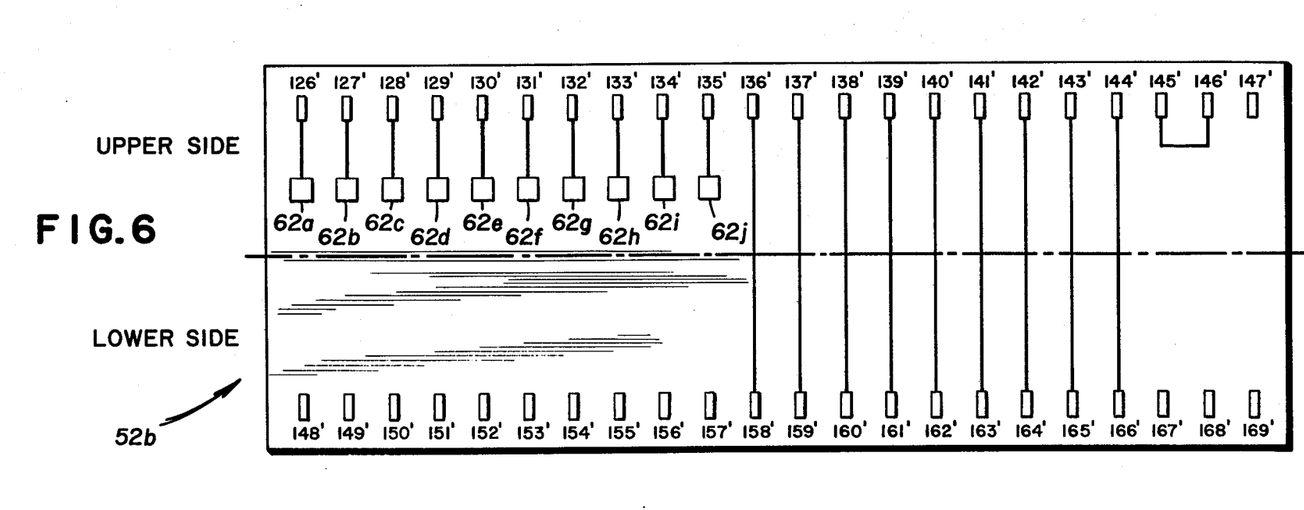
FIG. 6 is a schematic diagram of an advanced mode program card electrical circuit.

A second, more advanced mode of operation is possible by using a program card electrical circuit 52b as shown in FIG. 6. In this card circuit, a first set of terminals 136'–144' and a third set of terminals 158'–166' are interconnected in the same manner as the terminals 136–144 and 158–166, respectively, of the simple mode program card (FIG. 5). In addition, there is a second set of terminals 126'–135' to which are connected a corresponding set of touch point contacts 62a–62j, respectively. Card terminals 126'–135' mate with socket terminals 71–80, respectively. Also in this card circuit, card terminals 145' and 146' are connected in the same manner as terminals 145 and 146 of the simple mode card circuit; however, there is no connection between card terminal 147' and card terminal 146'. Thus, indicator lamp 44 is not automatically lit upon insertion of the advanced mode program card into the teaching device 4.

As shown in FIG. 4, the upper cover layer of the advanced mode program card has a number of openings 60a–60j formed therein which overlie touch point contacts 62a–62j, respectively. Adjacent each opening is the written form of a number from ZERO to NINE.

The operation of the teaching device using the advanced mode program card will now be described. With the selector switch 28 in the initial counter-clockwise-most position, wiper 36 contacts switch contact 32a and wiper 38 of switch 34 contacts switch contact 34a. Adjacent opening 60a is written the word ZERO. When probe point 18 is touched to touch point contact 62a through opening 60a, a circuit path is completed from E+, through indicator lamp 44, probe lead 14 and probe contact point 18, touch point 62a, card terminal 126', socket terminal 71, switch contact 34a, wiper 38, socket terminal 91, card terminals 146' and 145' and socket terminal 90 to ground. Lamp 44 therefore becomes lit to illuminate the "0" on the display disc 40 which is aligned with read-out opening 10. Touching the probe point 18 to any of the other touch points 62b–62j will not result in a completed circuit path so that indicator lamp 44 remains unlit, indicating that an incorrect answer has been chosen.

Rotating selector switch 28 one step in the clockwise direction causes ganged wipers 36 and 38 to contact switch points 32b and 34b, respectively. In this position, a circuit is completed through light emitting diode 12a, switch point 32b, wiper 36 and contacts 91, 146', 145' and 90 to cause diode 12a to light up. Touching probe point 18 to touch contact 62b through opening 60b adjacent which is written the word ONE will complete a circuit through terminals 127', 72, switch point 34b, wiper 38 and terminals 91, 146', 145' and 90 to cause indicator lamp 44 to light up, thereby illuminating the number "1" of display disc 40 aligned with read-out opening 10.

It will be appreciated that the operation in the advanced mode with respect to the lighting of indicator lamps 12a–12i is similar to the corresponding operation for the simple mode as described above. The principal difference is that in the simple mode circuit, indicator lamp 44 remains lit continuously by virtue of the connection between card terminals 147 and 146 whereas the advanced mode lacks this connection so that lamp 44 is lit only upon touching probe contact 18 with the appropriate one of touch points 62a–62j determined by the position of selector switch wiper 38. In the advanced mode operation, the student learns to associate the written form of a number with its numerical form and at the same time he is exposed to the basic concepts of addition and subtraction.

Figures 7, 8:
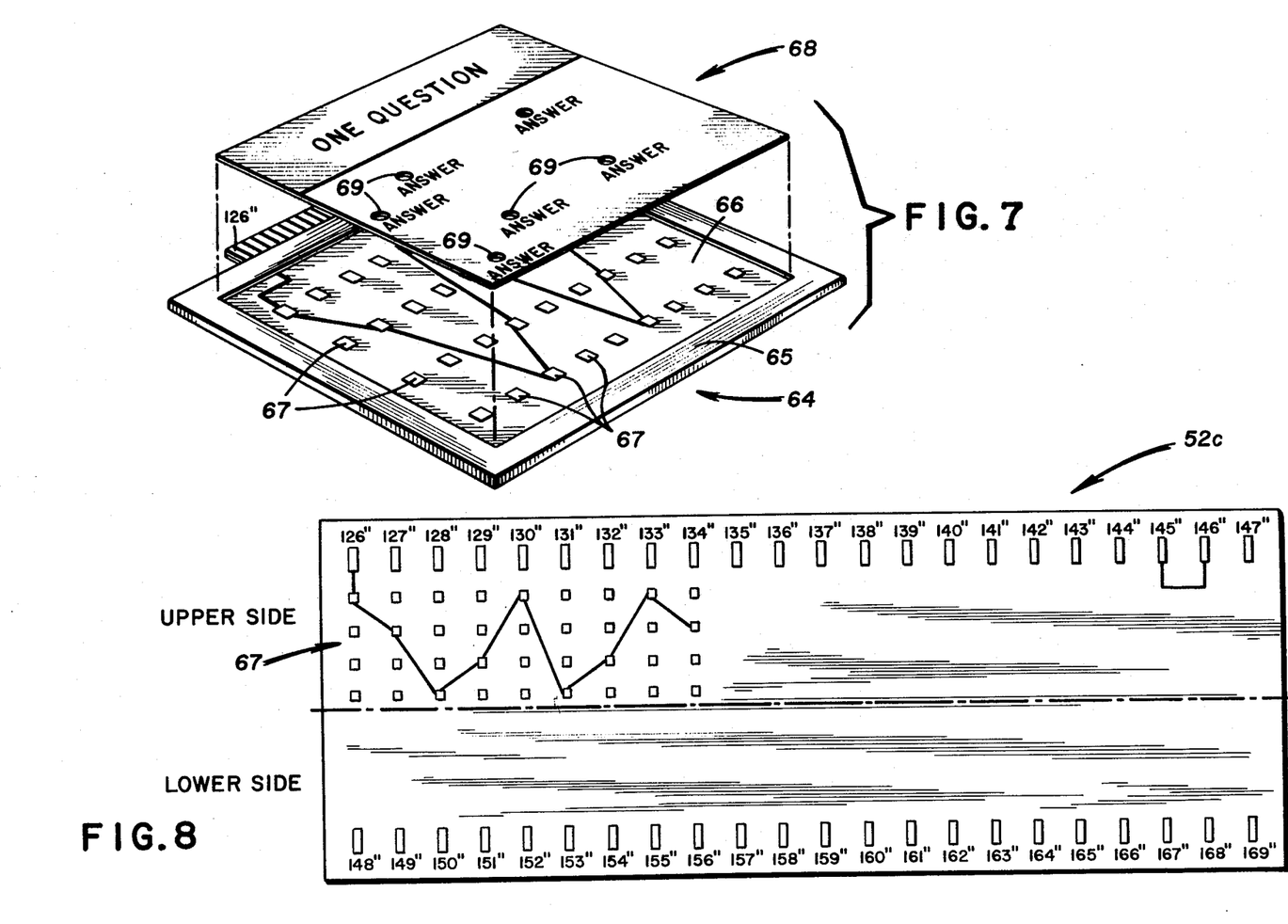
FIG. 7 is a perspective view of an alternative program card and its insert.
FIG. 8 is a schematic diagram of the electrical circuit of the program card of FIG. 7.

A still further type of program card 64 is shown in FIG. 7. This program card has a raised border 65 which defines a recessed center portion 66 on which are located a plurality of touch points 67 arranged in a matrix form. Some of these touch points 67 are connected in common to a single card terminal 126" (see FIG. 8); this common connection could be made through a hole in the board 52c to terminal 148". The remaining touch points are dummies, i.e., they are not connected electrically to terminal 126". Any one of a number of inserts 68 may be mounted on a recessed center portion of the program card. Each insert 68 has a question written thereon along with a plurality of answers. Adjacent each possible answer is an opening 69. The openings on the inset are arranged so that only the opening 69 adjacent the correct answer to the question overlies one of the live touch points 67 of the program card. The remaining openings overlie dummy touch points. With this arrangement, the selector switch 28 must be rotated to its extreme counter-clockwise position. When probe point 18 is inserted into the opening 69 in the insert 68 corresponding to the correct answer to the question, a circuit is completed between E+, lamp 44, probe 16, the matrixed touch points 67, card terminal 126", socket terminal 71, switch point 34a, wiper 38, socket terminal 91, card terminals 146" and 145" and socket terminal 90 to ground. Thus, when the correct answer is chosen, lamp 44 will be illuminated.

Figure 9:
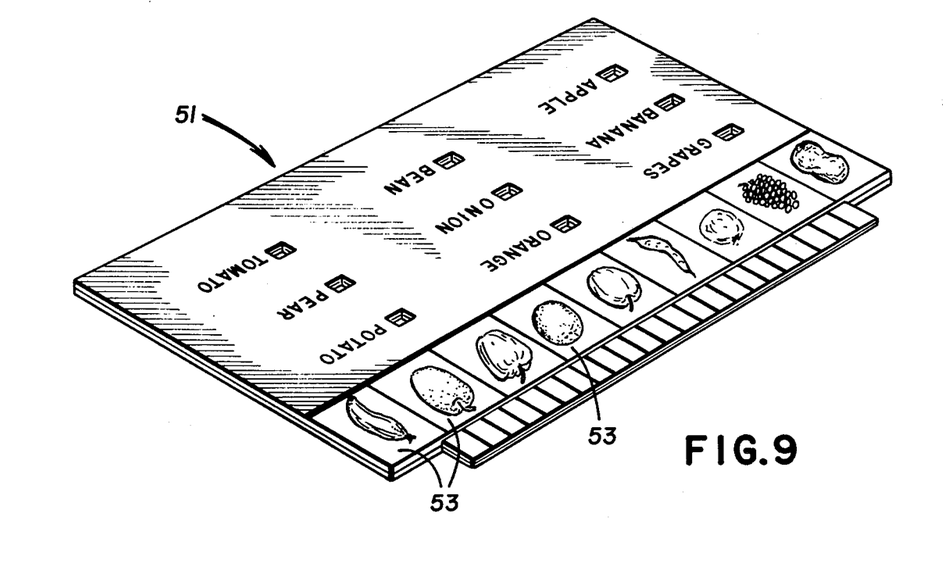
FIG. 9 is a modified form of the program card shown in FIG. 7.

In an alternative arrangement, a program card 51 (see FIG. 9) having a circuit similar to the advanced mode program card circuit 52b (FIG. 6) could be used, except omitting the connections between card terminals 136'–144' and 158'–166'. This would block out the portion of the circuit containing the series-connected diodes 118–125. Thus only one light emitting diode 12 would be lit at a time, depending on the position of switch wiper 36. With this arrangement, up to nine questions 53 could be presented on the card insert 68, each question being indicated by an appropriately lit light emitting diode 12 as the selector switch 28 is rotated. Each question is accompanied by a plurality of possible answers. Adjacent each answer lies an opening 69. Only the opening adjacent the correct answer overlies a touch point 62. The correct answer is indicated when probe 16 makes contact with the appropriate touch point 62, thereby closing a circuit to illuminate lamp 44. This type of card is particularly suitable for matching a picture with its corresponding written description.

It is to be understood that various modifications in the structural details of the preferred embodiment described herein may be made within the scope of this invention and without departing from the spirit thereof. It is intended that the scope of this invention shall be limited solely by the hereafter appended claims.

What is claimed is:

1. A teaching device, comprising:
   a base member having a planar surface portion on which a program card may be mounted;
   at least one read-out opening formed in said base member;
   switch means mounted on said base member and having first and second sets of switch contacts mounted coaxially with a rotatable shaft, and first and second wipers mounted on said shaft for rotation therewith, said first and second wipers respectively engageable with said first and second sets of switch contacts;
   a display member mounted on said shaft for rotation therewith, said display member bearing indicia which are selectively aligned with said read-out opening upon rotation of said shaft;
   an indicator light source mounted rearwardly of said display member for illuminating said indicia aligned with said read-out opening;
   a plurality of count indicating members mounted to a front-facing portion of said base member, said plurality of count indicating members being connected in common to an electrical source and individually connected to respective ones of said first set of switch contacts; and
   an electrical socket located in said base member for receiving a cooperating electrical terminal portion of a progarm card mounted on said base member, said electrical socket including a first set of terminals to each of which is electrically connected a corresponding one of said first set of switch contacts, a second set of terminals to each of which is electrically connected a corresponding one of said second set of switch contacts, a third set of terminals equal in number to said first set of terminals and between each two of which is connected one of a plurality of series-connected diodes, a fourth terminal to which said first and second wipers are commonly electrically connected, a fifth terminal electrically connected to ground, and a sixth terminal electrically connected to one terminal of said illuminated indicator light source, said indicator light source having a second terminal electrically connected to said electrical source.

2. The teaching device according to claim 1, further comprising a program card having an electrical circuit thereon, said electrical circuit including electrical terminals extending from one edge portion of said card and mating with said electrical socket terminals when said card is mounted on said base member.

3. A teaching device according to claim 2, further comprising a plurality of exposed touch point contacts on said card and wherein said card electrical terminals include a plurality of card terminals electrically connected to said exposed touch point contacts and which mate with said second set of socket terminals, said program card bearing indicia adjacent each touch point contact corresponding to the indicia on said indicia bearing member.

4. The teaching device according to claim 3, further comprising:
   a probe member having one terminal connected to said indicator light source and a second terminal selectively engageable with said touch point contacts on said program card;
   wherein when said card is mounted on said base member, said indicator light source is electrically connected through said probe, a selected touch point contacted by said probe, a corresponding one of said plurality of card terminals, and a corresponding one of said second set of socket terminals to a corresponding one of said second set of switch contacts, wherein current flows through said indicator light source when said second wiper engages said corresponding one of said second set of switch contacts.

5. The teaching device according to claim 1, further comprising a program card having an electrical circuit thereon, said electrical circuit including electrical terminals extending from one edge portion of said card and mating with said electrical socket terminals when said card is mounted on said base member, said card terminals including:
   a first set of terminals which mate with said first set of socket terminals;
   a second set of terminals which mate with said third set of socket terminals and which are electrically connected directly to said first set of card terminals;
   third and fourth terminals which mate with said fourth and fifth socket terminals respectively, said third and fourth card terminals being electrically connected directly to each other; and
   a fifth terminal which mates with said sixth socket terminal, said fifth card terminal being electrically connected to said third and fourth card terminals;
   wherein when said program card is mounted on said base member, each said illuminating member is connected to its corresponding switch contact and is further connected to all succeeding switch contacts of said first set of switch contacts through said series-connected diodes; and
   wherein said first wiper and said indicator light source are connected to ground through said third, fourth, and fifth card terminals.

6. The teach device according to claim 1, further comprising a program card having an electrical circuit thereon, said electrical circuit including a plurality of exposed touch point cntacts and electrical terminals extending from one edge portion of said card and mating with said electrical socket terminals when said card is mounted on said base member, said card terminals including:
   a first set of terminals which mate with said first set of socket terminals;
   a second set of terminals which mate with said second set of socket terminals, said second set of card terminals being electrically connected to a corresponding one of said exposed touch point contacts;
   a third set of terminals which mate with said third set of socket terminals and which are electrically connected directly to said first set of card terminals; and
   third and fourth terminals which mate with said fourth and fifth socket terminals respectively, said third and fourth card terminals being electrically connected directly to each other; and
   a probe member having one terminal connected to said indicator light source and a second terminal selectively engageable with said touch point contacts on said program card;
   wherein when said program card is mounted on said base member, each said count indicating member is connected to its corresponding switch contact and is further connected to succeeding switch contacts of said first set of switch contacts through said series-connected diodes; said first and second wipers are connected to ground through said third and fourth card terminals; and said illuminated indicator is electrically connected through said probe, a selected touch point contacted by said probe, a corresponding one of said second set of card terminals, and a corresponding one of said second set of socket terminal to a corresponding one of said second set of switch contacts, such that current flows through said illuminated indicator when said second wiper engages said corresponding one of said second set of switch contacts.

7. The teaching device according to claim 1, further comprising:
   a program card having a recessed surface portion into which one of a plurality of indicia bearing inserts may be inserted, said recessed surface portion having an electrical circuit thereon composed of a plurality of touch points electrically connected in common, said card electrical circuit further comprising at least one terminal to which said touch points are commonly connected and which mates with one of said second set of socket terminals, and a pair of further terminals connected in common which mate with said fourth and fifth socket terminals to electrically connect said second wiper to ground when said program card is mounted on said base member; and
   a probe member having one terminal connected to said illuminated indicator and a second terminal selectively engageable with said touch points on said program card;
   wherein when said card is mounted on said base member, said illuminated indicator is electrically connected through said probe, a selected touch point contacted by said probe, said at least one card terminal and said one of said second set of socket terminals, wherein current flows through said indicator light source when said second wiper engages the switch contact of said second set of switch contacts connected to said one of said second set of socket terminals.

8. The teaching device according to claim 7, further comprising a plurality of inserts each selectively mountable in said recessed surface portion of said program card, said inserts each having a plurality of holes formed therein such that only one hole overlies one of said touch points, said inserts each having indicia thereon corresponding to a question and a plurality of answers such that the indicia corresponding to the correct answer to the question on the inlay lies adjacent to said at least one hole overlying said touch point.

9. The teaching device according to claim 1:
said base member having a front upright wall, a back upright wall extending higher than said front wall, a recessed planar surface portion extending from an upper portion of said front wall to an intermediate portion of said back wall and a pair of side walls extending slightly higher than said planar surface portion to define lateral extremeties of said recessed surface portion;
said read-out opening is formed in an upper portion of said back wall;
said electrical socket is located at the junction of said back wall and said planar surface; and
said plurality of count indicating members are mounted on said upper portion of said back wall.

10. The teaching device according to claim 1, wherein said count indicating members comprise light emitting diodes.

11. A teaching device, comprising:
a base member having a planar surface portion on which a program card may be mounted;
at least one read-out opening formed in said base member;
switch means mounted on said base member and having a set of switch contacts mounted coaxially with a rotatable shaft, and a wiper mounted on said shaft for rotation therewith, said wiper engaging said set of switch contacts;
a display member mounted on said shaft for rotation therewith, said display member bearing indicia which are selectively aligned with said read-out opening upon rotation of said shaft;
an indicator light source mounted rearwardly of said display member for illuminating said indicia aligned with said read-out opening;
a plurality of count indicating members mounted to a front-facing portion of said base member, said plurality of count indicating members being connected in common to an electrical source and individually connected to respective ones of said set of switch contacts; and
an electrical socket located in said base member for receiving a cooperating electrical terminal portion of a program card mounted on said base member, said electrical socket including a first set of terminals to each of which is electrically connected a corresponding one of said set of switch contacts, a third set of terminals equal in number to said first set of terminals and between each two of which is connected one of a plurality of series-connected diodes, a fourth terminal to which said wiper is electrically connected, a fifth terminal electrically connected to ground and a sixth terminal electrically connected to one terminal of said indicator light source, said indicator light service having a second terminal electrically connected to said electrical source.

* * * * *